United States Patent [19]

Koronka

[11] 4,289,081

[45] Sep. 15, 1981

[54] COULTER DEVICE FOR DIRECT SEED DRILLS

[75] Inventor: Paul Koronka, Upwaltham, England

[73] Assignee: Imperial Chemical Industries Limited, London, England

[21] Appl. No.: 970,875

[22] Filed: Dec. 18, 1978

[30] Foreign Application Priority Data

Dec. 21, 1977 [GB] United Kingdom .............. 53186/77
May 25, 1978 [GB] United Kingdom .............. 22433/78

[51] Int. Cl.³ .............................................. A01C 5/06
[52] U.S. Cl. ....................................... 111/88; 111/81; 111/87
[58] Field of Search ...................... 111/86, 87, 88, 81; 172/151, 184-187, 559

[56] References Cited

U.S. PATENT DOCUMENTS

| | | | |
|---|---|---|---|
| 331,753 | 12/1885 | Arnett | 111/88 |
| 518,671 | 4/1894 | Lancaster | 111/81 |
| 605,348 | 6/1898 | Schultz | 111/87 |
| 731,645 | 6/1903 | Wilson | 111/81 |
| T862,011 | 5/1969 | Koronka et al. | 172/575 X |
| 975,577 | 11/1910 | Shackelford | 172/559 |
| 2,277,622 | 3/1942 | White | 111/87 |
| 2,429,841 | 10/1947 | Phillips | 111/87 X |
| 2,486,442 | 11/1949 | Silver | 172/187 X |
| 2,691,353 | 10/1954 | Secondo | 111/87 X |

FOREIGN PATENT DOCUMENTS

2050146 4/1972 Fed. Rep. of Germany ........ 111/88

*Primary Examiner*—Steven A. Bratlie
*Attorney, Agent, or Firm*—Cushman, Darby & Cushman

[57] ABSTRACT

A coulter arrangement and associated drill are provided that are useful in all types of soil, minimize dragging of vegetation into the seed slots, and insure sufficient covering of seed with soil. First and second dished discs are located on frame members, the second disc intercepting the soil displaced by the frist disc. A third dished disc having concave and convex faces and smaller in diameter than the first disc is mounted on another frame member. The third disc is mounted with respect to the first disc and a seed delivery tube so that the third disc removes trash and plant debris from the slot cut by the first disc, and guides seeds from the seed delivery tube directly into the slot.

7 Claims, 6 Drawing Figures

COULTER DEVICE FOR DIRECT SEED DRILLS

The invention relates to seed drills, and more particularly to a coulter device for drills of the so-called "direct" type in which one or more rotatable discs, arranged in rows individually, or in associated pairs, is or are pressed into the soil surface to cut a slot or slots therein and into which seed and/or fertiliser are fed.

In direct drills of this kind it is known to use inclined pairs of flat discs to cut the slot or drill for the seed, and it is also known to use a single, dished, disc for this purpose. In general these devices have worked well in satisfactory soil conditions.

However each of these arrangements has disadvantages in certain situations. For example the inclined discs in pairs, whether or not accompanied by a single rotatable cutting disc mounted ahead of each inclined pair, as in the triple disc coulters, tend in wet, clay soils to smear the sides and bottom of the slot, hindering desired coverage of the seed by soil tumbling upon it after the drill has passed by. Sometimes, too, straw stubble or other vegetation can be dragged down into the slot with the seed and this, if anaerobic conditions prevail, results in the generation of harmful acids which adversely affect germination. Furthermore exposed seed insufficiently covered over with soil, is subject to bird and rodent consumption; whilst smeared slots can cause water-logging of the drilled seed in the slots. Some of these disadvantages can be overcome by using lime-coated seed, but this adds to the overall cost of the drilling process.

Single, inclined, dished, discs have been used to overcome some of the problems mentioned above. Such discs obviously cannot smear both of the sides, and the bottom, of the slot (but may smear one side); and, in general, they will throw aside most of the straw or stubble thereby avoiding sowing of the seed in direct contact with acid-generating, rotting, vegetation.

Even these single, dished, discs, however, still tend to lead to exposed seed, or seed insufficiently covered by a layer of soil, or deposited under a slice of soil in such a way as to be uncovered by any subsequent harrowing actually deployed to remedy the lack of covering; or to seed being suffocated by any rolling used for the same reason. Thus a single, inclined, dished, disc tends to throw away, or overthrow, the soil, or turn over a slice, at the same time as it throws away from the drill or slot the unwanted straw or other vegetation.

The present invention provides a coulter arrangement for a drill wherein a first, rotatable, dished, disc has disposed behind it, relative to the direction of its slot-cutting travel, a second, rotatable, dished, disc, located adjacent the first disc to intercept the soil displaced by the first disc and to mechanically guide it so that it tumbles into the slot cut by the first disc.

The first and second discs can be mounted on the same, or a different, frame member or girder.

Preferably both discs have the planes defined by, i.e. containing, their peripheral edges inclined with respect to the vertical, or to the direction of forward travel of the drill, or inclined to both. The second, i.e. trailing disc, is, with respect to the plane containing the direction of travel, set in a plane spaced apart from that of the leading disc, that is to one side thereof, or off-set therefrom. It may be of larger or smaller diameter, mounted on the same, or a different girder, with the same, or a different, degree of biassing or pressure-loading, for example by springs, towards or into the soil or ground being drilled. Either disc, or both, may be similar, or differently, inclined in degree, in the same, or different planes. They may be disposed so as to have their peripheral edges lying apart, that is, so as to have a gap between them; or so as to overlap to a greater or lesser extent. In any event their concavities may face the same or opposite directions. Preferably there is an overlapping, when viewed from the side, of several inches. Preferred degrees of inclination are from about 2 to about 10 degrees, especially 5 to 8 degrees, with respect to the vertical plane containing the direction of travel of the drill. Furthermore, the inclination is such that, when viewed from above, the inside concave surface of each dished disc faces upwardly to a very slight extent, and when viewed from directly in front with respect to the direction of travel, faces forwardly to a very slight extent. Preferably the second, trailing, disc is inclined to a slightly lesser extent, than the first, leading, disc. The lowermost point of its peripheral edge may, when the coulter arrangement is viewed from the side, be disposed so that its tangent lies in the same, or in a higher, or lower, plane to that containing the tangent of the lowermost point of the peripheral edge of the first, leading, slot-cutting, disc.

The peripheral edges of either, or both, of the discs may be continuous or be notched, and may be sharpened to differing extents, or be blunt.

The first and second discs may be mounted on the same, rearwardly-extending, girder of the drill frame, and this girder can be weight or spring-biased so as to tend to force at least the first disc into a soil-surface penetrating disposition when the drill is being used. If desired the girder can be disposed in two, pivotally-connected halves, each carrying a first or second disc, and each subjected to different amounts of spring (or other biassing means) loading. A further arrangement could involve alternate girders carrying pairs of first or second discs.

In a further coulter arrangement according to the invention a first disc may have located alongside it a third, rotatable, smaller-diameter, dished disc having its concave surface facing the convex surface of the first disc and its front peripheral edge in close proximity thereto.

The third disc is preferably mounted so as to be constrained in its bodily movement solely to movement in an upward direction. The purpose of the third disc is to remove trash and plant debris so that seed can be guided directly into the slot cut in the soil by the first disc.

The third, smaller-diameter disc is conveniently rotatably mounted on a cranked arm having its remote end constructed to embrace, and be rotatable about, the shaft of the first, slot-cutting disc. A seed tube connectable to a hopper may be provided and having its seed-delivery orifice disposed just above the concave surface of the third disc and rearwardly of an upright plane containing the axle of the first disc.

A coulter arrangement according to the invention can be used in any seed and/or fertiliser drill of the direct type and the present invention embraces drills incorporating a coulter arrangement according to the invention.

For a better understanding of the invention, reference will now be made to the accompanying drawings in which, by way of example only, FIGS. 1 to 3, and 4 to 6, respectively, represent specific coulter arrangements or devices for a direct drill according to the invention; and in which.

Figure 1:
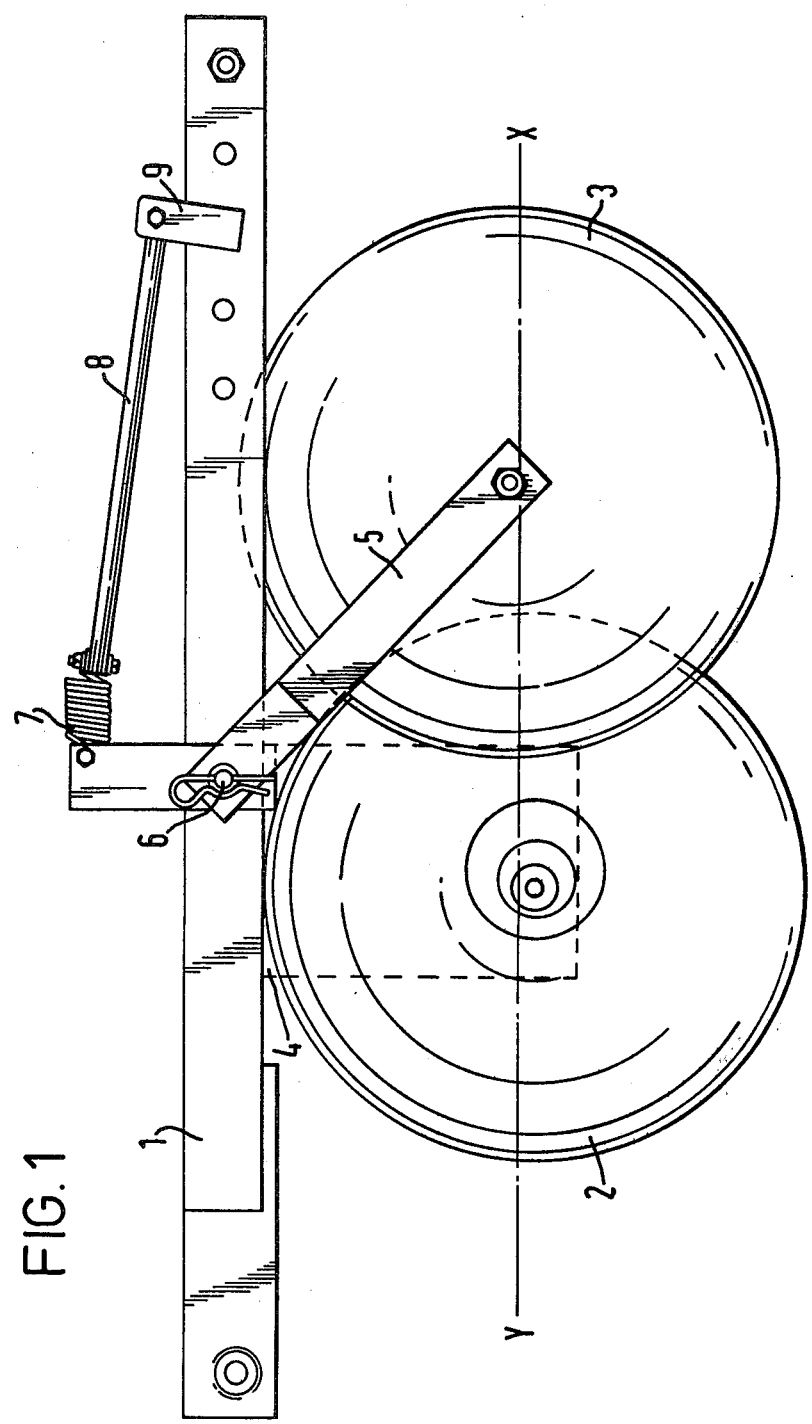
FIG. 1 is a side view of a first coulter device, the direction of travel in use being from right to left, i.e. in the direction of the line xy.

A girder or frame member 1 of a direct drill (not shown) carries dashed discs 2, 3. The disc 2 is mounted on girder 1 by a bolted-on, dependent leg 4 on which it is freely rotatable. The disc 3 also freely rotatable is pivotally mounted on the girder 1 by means of a cranked arm 5 and pin 6. The crank arm is biassed by a spring 7 and tie rod 8 connection to the girder 1, the tie rod 8 being bolted to a strut 9 welded on to the girder.

Figure 2:
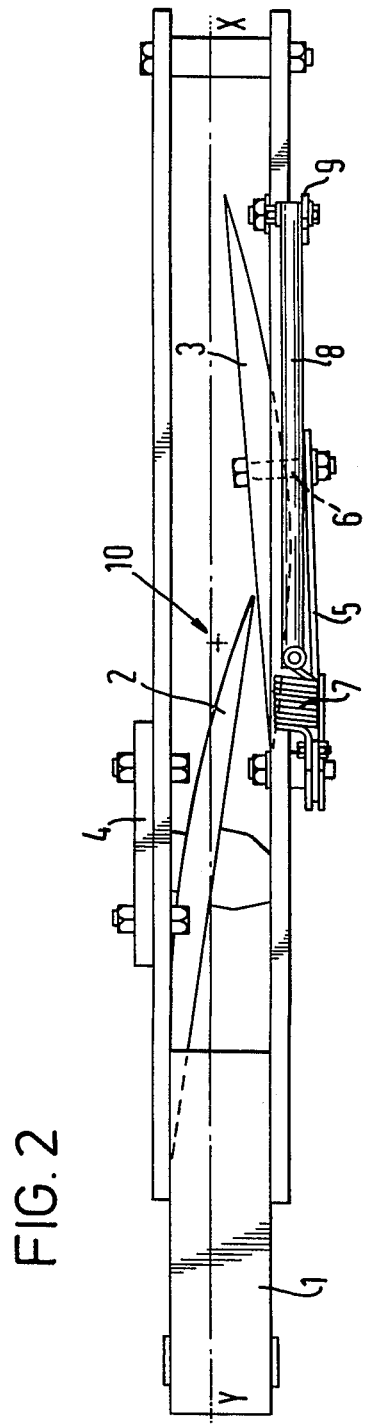
FIG. 2 is a plan view, that is a view from directly above the device of FIG. 1 looking down upon it; the direction of travel being in the direction of the line xy.

In use the direct drill (not shown) is moved over the ground so that the girder and discs move in a direction from right to left in FIGS. 1 and 2, that is in the direction xy. The disc 2 cuts a slot in the soil, the girder 1 being biassed by means (not shown) towards the ground so as to cause the disc 2 peripheral edge to cut into the soil surface by a few centimeters, and thereby create a slot into which seed is dropped by a device mounted on the drill (not shown) delivering it a point 10 (see FIG. 2) just behind the concave disc 2 surface and rearwardly of the pivotal axis of rotation of the disc 2. The disc 3 then rotates by ground contact so as to ensure that the soil displaced by the slot-cutting action of the disc 2 is guided back, together with any displaced seed, to fall into the slot. In this way an efficient seeding process is achieved.

Figure 4:
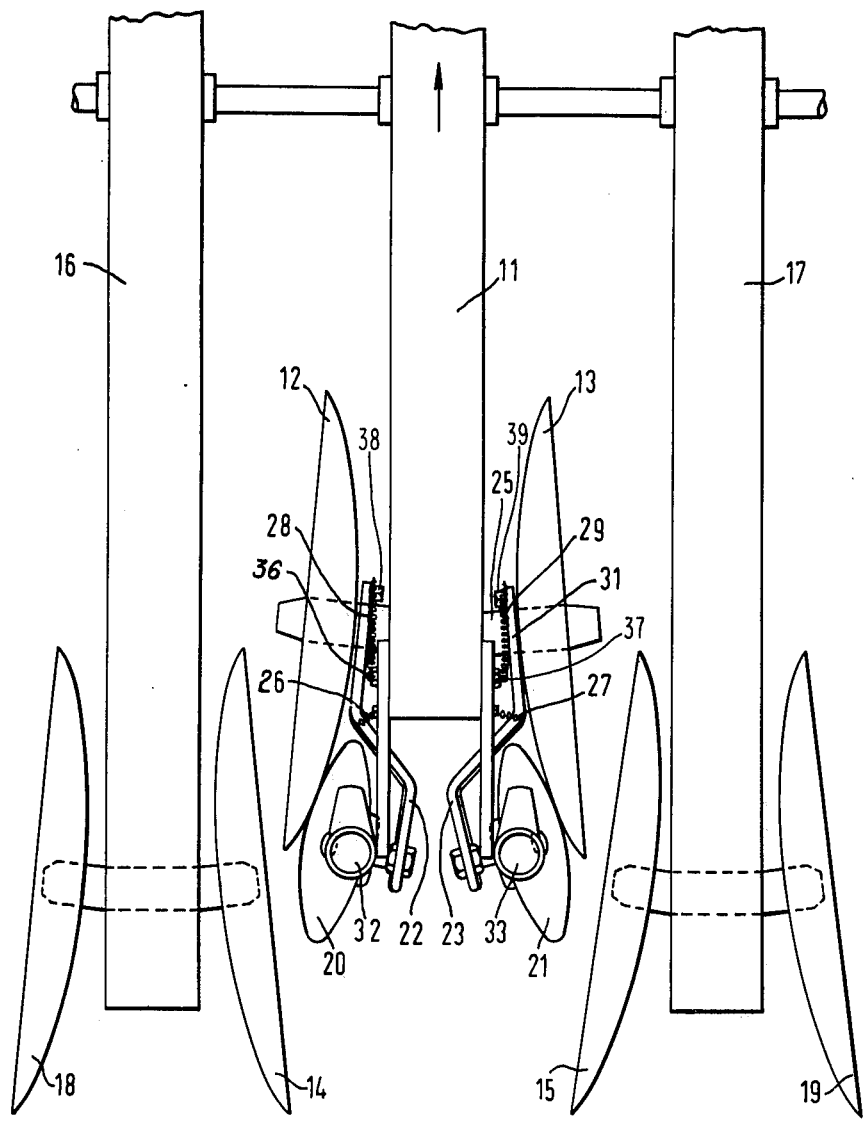
FIG. 4 is a plan view of a second coulter device according to the invention; the direction of travel of the device in use being along a line extending upwardly from the foot of the sheet.
Figure 5:
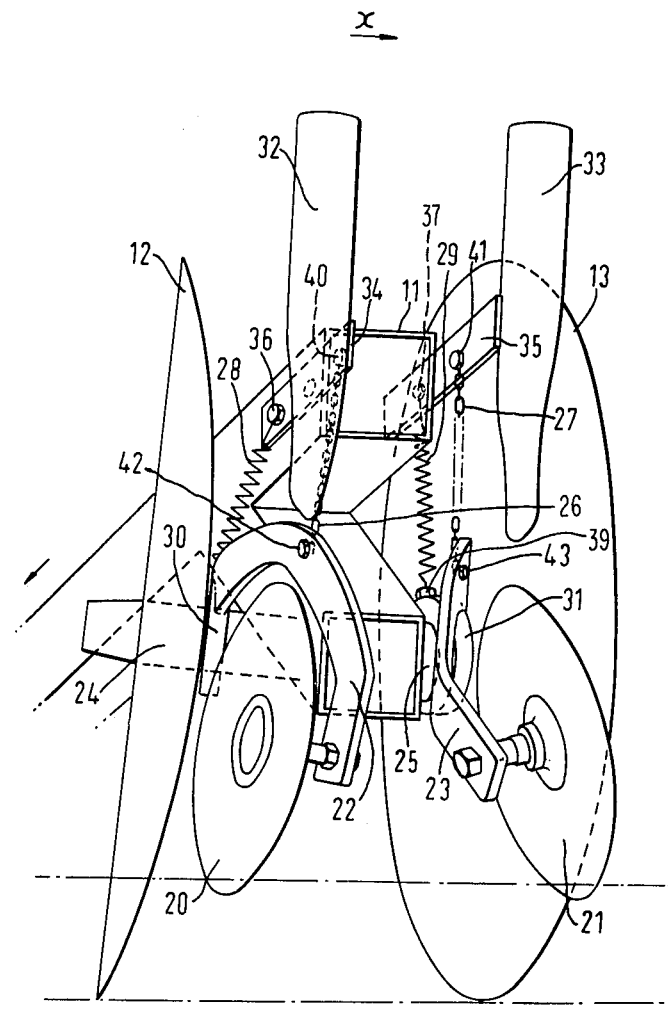
FIG. 5 is a perspective rear view from ground level of the central bar and twin-disc coulter arrangement of FIG. 5 with twin seed tubes, and small guide and trash clearing discs shown.
Figure 6:
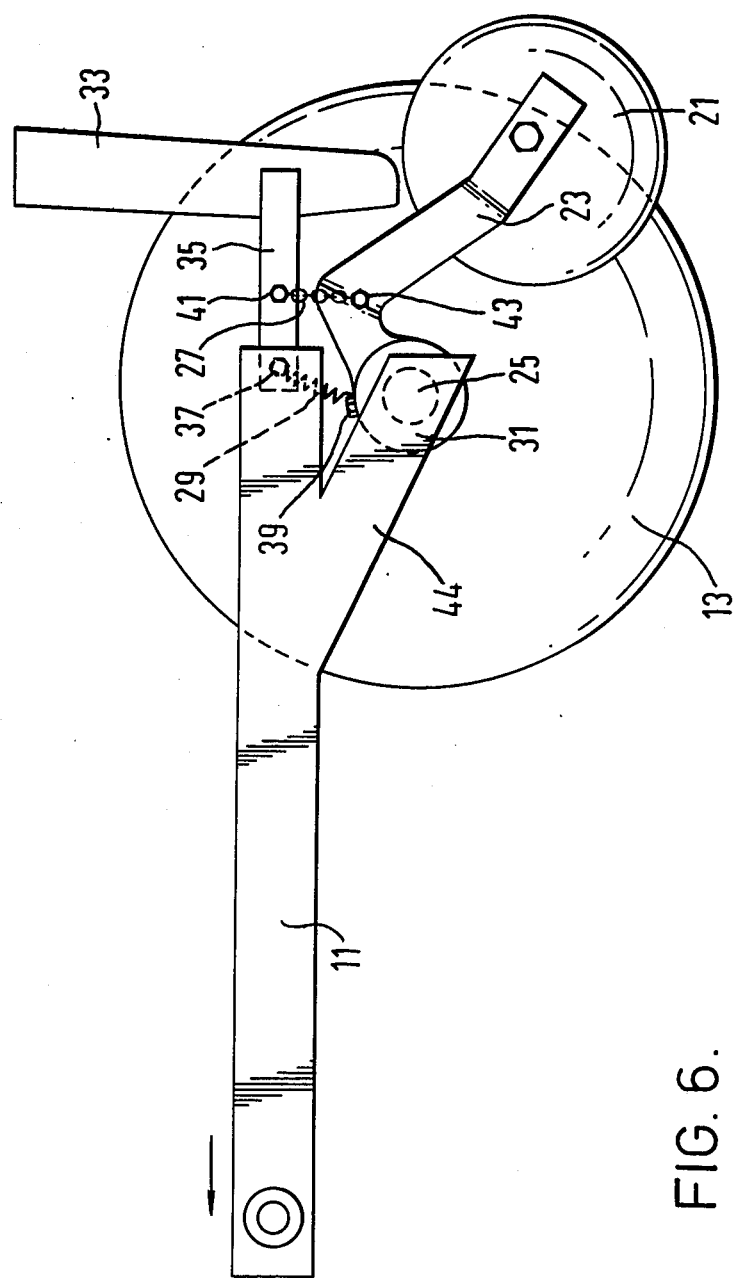
FIG. 6 is a sectional side view of the arrangement shown in FIG. 5 along the line xy.

In the device shown in FIGS. 4, 5 and 6 a frame girder member 11 carries a pair of freely rotatable slot-cutting dished discs 12, 13, whilst associated, freely rotatable, soil-intercepting dished discs 14, 15 are arranged, in the manner shown, on girder members 16, 17. Each girder 16, 17 carries a pair of soil-intercepting dished discs 14, 18 and 15, 19. Thus the seed drill may comprise a series of girders, each of which, alternately, carries a pair of slot-cutting, or soil-intercepting dished discs. The end girders, however, require to carry only one, inwardly-facing, soil-intercepting disc.

As shown in FIG. 5, in this particular device according to the invention, freely rotatable, smaller-diameter, dished discs, 20, 21 are disposed, as shown, in the location of the rearward, i.e. trailing, peripheral cutting edges of the slot-cutting discs 12, 13. The small discs 20, 21 are carried by cranked arms 22, 23 mounted on rings 30, 31 which can rotate freely about the shafts 24, 25 carrying the slot-cutting discs 12, 13. The cranked arms, however, are constrained by adjustable length chains 26, 27 from rotating farther clockwise than the particular positions shown, but can rotate anticlockwise to a limited extent against biassing springs 28, 29. Seed tubes 32, 33 (connectable to a hopper seed supply - not shown) have seed-releasing orifices disposed just above the concave dished surfaces of the discs 20, 21 which themselves face the convex surfaces of slot-cutting discs 12, 13. The seed tubes are carried on extension arms 34, 35 secured by bolts 36, 37 to the girder 11. The biassing springs 28, 29 are secured at one end by the bolts 36, 37 and at their other ends by bolts 38, 39 secured to the rings 30, 31. The ends of the chains 26, 27 are secured by bolts 40, 41 and 42, 43 to the respective extension arms 34, 35 and cranked arms 22, 23.

The girder 11 will be seen in FIG. 6 to have an integral dependent arm 44 which carries the shafts 24, 25 of the slot-cutting discs 12, 13.

Figure 3:
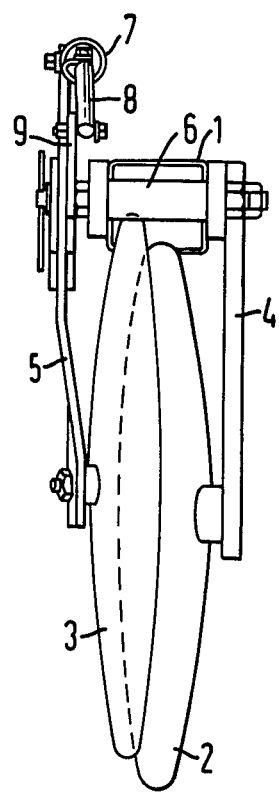
FIG. 3 is a rear view of the device of FIGS. 1 and 2 with respect to its direction of travel in use, that is a view of the device looking along the line xy from x to y.

In operation the slot-cutting discs 12, 13 are drawn from right to left in FIGS. 5, 6, and from bottom to top in FIG. 4, by means of girder 11, and are pressed several inches into the soil by biassing means (not shown) operating upon girder 11. The discs 20, 21 penetrate the soil surface by only about one half to one or two inches. All these discs, and the disc pairs 14, 18 and 15, 19, are rotated by their contact with the soil, the lower peripheral edges of the slot-cutting discs extending more deeply into the soil than those of the soil-intercepting discs (as in the device of FIGS. 1 to 3) and still more deeply than the trash-clearing and seed-guiding third discs.

I claim:

1. A drill comprising:
a plurality of first frame members extending rearwardly with respect to the forward direction of travel of said drill, each of said plurality of first frame members being disposed in a spaced apart, substantially parallel orientation with respect to one another and each having a free end: a plurality of first, rotatable, dished discs for cutting slots into the soil, one pair of each of said first discs being mounted to one of each said first frame members at the respective said free end thereof, said first discs of each of said one pair of first discs being mounted to opposite sides of said free end and having convex surfaces facing each other; a plurality of third, rotatable, dished discs of smaller diameter then said first discs, one rearwardly overlapping each individual one of said first discs and having a concave surface facing the convex surface its associated first disc, the front peripheral edge of each said third disc being in close proximity thereto, each of said third discs being mounted to a cranked arm having its remote end constructed to embrace, and be rotatable about, an axle connection between its respective first disc and first frame member; a plurality of seed delivery tubes each having a seed delivery orifice and each having its seed delivery orifice disposed vertically above the concave surface a respective third disc and rearwardly of an upright plane containing a respective axle connection between a first disc and first frame member, and a plurality of second frame members extending in a rearward direction and disposed in a spaced apart, substantially parallel orientation with respect to one another and disposed alternately between members of said plurality of first frame members, each of said second frame members having a free end positioned rearwardly of said free ends of said first frame members, and a plurality of second rotatable, dished discs, for intercepting the soil displaced by the said plurality of first discs and to mechanically guide the soil so that it tumbles into the slots cut by said first discs, one pair each of said second discs being mounted to one of each of said free ends of said second frame members, so that each individual said second disc is rearwardly overlapping the closest member said plurality of first discs, having a concave surface facing a concave surface of said member of said plurality of said first discs.

2. A coulter arrangement as claimed in claim 1 wherein said first discs are of larger diameter than said second discs, the lowermost peripheral edge of said first discs lying below the lowermost edge of said second discs.

3. A coulter arrangement as claimed in claim 1 wherein said second frame members include biasing means which urge said second discs downwardly towards the soil.

4. A coulter arrangement as claimed in claim 1 wherein said cranked arm includes biasing means for allowing upward movement of said third discs against the bias of said biasing means.

5. A coulter arrangement as claimed in claim 1 wherein the plane containing the peripheral edge of each of said first discs is inclined with respect to at least one of said forward direction and a vertical direction.

6. A coulter arrangement as claimed in claim 1 wherein the plane containing the peripheral edge of each of said third discs is inclined with respect to at least one of said forward directions and a vertical direction.

7. A coulter arrangement as claimed in claim 1 wherein the plane containing the peripheral edge of each of said second discs is inclined with respect to at least one of said forward direction and a vertical direction.

* * * * *